United States Patent

Yamagata et al.

[11] Patent Number: 5,917,619
[45] Date of Patent: Jun. 29, 1999

[54] IMAGE FORMING APPARATUS

[75] Inventors: Hideaki Yamagata, Yokohama; Toshio Miyazawa, Kawasaki, both of Japan

[73] Assignee: Ricoh Company, Ltd., Tokyo, Japan

[21] Appl. No.: 08/352,030

[22] Filed: Nov. 30, 1994

[30] Foreign Application Priority Data

Dec. 8, 1993 [JP] Japan .................................. 5-340563

[51] Int. Cl.⁶ ...................................................... H04N 1/46
[52] U.S. Cl. .............................. 358/501; 358/504; 380/3; 382/135; 399/366
[58] Field of Search ..................... 358/500, 501, 358/504, 505, 518, 523, 530, 400, 401, 406, 443, 448, 468, 474, 453, 538; 355/201; 380/3, 5; 382/135; 399/366

[56] References Cited

U.S. PATENT DOCUMENTS

| | | | |
|---|---|---|---|
| 4,586,811 | 5/1986 | Kubo et al. | 355/201 |
| 4,587,536 | 5/1986 | Saito et al. | 347/118 |
| 5,216,724 | 6/1993 | Suzuki et al. | |
| 5,321,470 | 6/1994 | Hasuo et al. | 358/501 |
| 5,363,202 | 11/1994 | Udagawa et al. | 358/501 |
| 5,424,807 | 6/1995 | Ohmura | 355/201 |
| 5,440,409 | 8/1995 | Sugano et al. | 358/501 |

FOREIGN PATENT DOCUMENTS

| | | |
|---|---|---|
| 2-83571 | 3/1990 | Japan . |
| 4-54681 | 2/1992 | Japan . |

*Primary Examiner*—Thomas D. Lee
*Attorney, Agent, or Firm*—Oblon, Spivak, McClelland, Maier & Neustadt, P.C.

[57] ABSTRACT

The present invention provides a color tone detection sensor for detecting the tone of a color actually printed, a color conversion processing section for executing color conversion to inputted image data, and a system controller for executing color tone detection prior to an operation for detecting a copy-inhibited document in a copy-inhibited document detecting section, causing the copy-inhibited document detecting section to execute the operation for detecting a copy-inhibited document using image data subjected to color conversion in the color conversion processing section when the detected color tone is not a specified one, or causing the copy-inhibited document detecting section to execute the same operation using the inputted image data when the detected color tone is a specified one.

18 Claims, 9 Drawing Sheets

F I G. 3
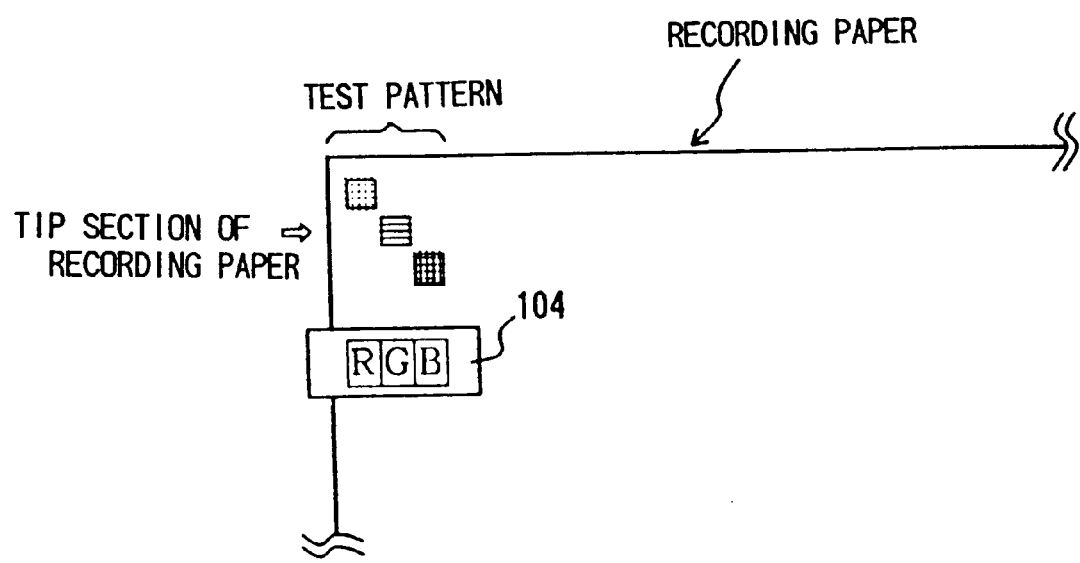

IMAGE FORMING APPARATUS

FIELD OF THE INVENTION

The present invention relates to an image forming apparatus having a copy-inhibited document detecting function for making a determination as to whether input image data is of a copy-inhibited document, such as bills or marketable securities or not, and more particularly to an image forming apparatus for detecting a copy-inhibited document using color tone data of input image data.

BACKGROUND OF THE INVENTION

In recent years, in association with advance in the image processing technology and the image forming technology, images are so exquisitely and accurately formed that sometimes, for instance, a copied bill copied by a color copying machine can not be distinguished from a real one. For this reason, now efforts are made for development of an apparatus which can detect a copy-inhibited document such as bills or marketable securities which are inhibited to be copied and inhibits illegally copying copy-inhibited documents.

As a method of detecting copy-inhibited documents such as bills or marketable securities, there have been disclosed, for instance, a method disclosed in Japanese Patent Laid Open Publication No.83571/1990 disclosing an "image recording apparatus" in which input image data is compared to a particular mark (pattern data) previously registered therein by way of the pattern matching method and which determines that a document is a copy-inhibited one when the particular mark exists in the input data, and a method disclosed in Japanese Patent Laid Open Publication No.54681/1992 disclosing a "color image processing apparatus" which detects a copy-inhibited document by comparing a form of histogram (color tome data) based on color phase distribution.

In case of Japanese Patent Laid Open Publication No.54681/1992, however, although disturbance of input image data is corrected by executing such processing as smoothing to the image data to improve accuracy in detection, the determination is executed by comparing a form of histogram based on color distribution, so that, if the tone of image data is intentionally changed, accuracy in detecting copy-inhibited documents becomes lower and sometimes a copy-inhibited document may be mistaken for a general document.

For this reason, in a conventional type of apparatus detecting a copy-inhibited document using color tone data, there is the possibility that a copy-inhibited document copied by intentionally changing color tone of image data and also changing tone of a color of toner or ink or the like used in an image output device such as a printer may be overlooked.

SUMMARY OF THE INVENTION

It is a first object of the present invention to make it possible to detect a copy-inhibited document accurately even in a case where color tone of image data is intentionally changed.

Also the present invention was made in the light of the circumstances as described above, and it is a second object of the present invention to insure prevention of copying of a copy-inhibited document even in a case where color tone of toner or ink or the like used in an image output device is intentionally changed.

The image forming apparatus according to the present invention detects the tone of a color actually printed by an image output means by detecting a color tone with an color tone detecting means prior to determination in a copy-inhibited document detecting means, and if a color detected is not a specified one, improves accuracy in detection by a the copy-inhibited document detecting means by executing detection with the copy-inhibited document detecting means using image data subjected to color conversion through a color converting means.

Also in the present invention, color detection is executed, prior to detection by the copy-inhibited document detecting means, by the color tone detecting means to detect the tone of a color printed by the image output means, and if the detected color is not a specified one, an output operation by the image output means is inhibited to eliminate the possibility for the copy-inhibited document to be copied.

Other objects and features of this invention will become understood from the following description with reference to the accompanying drawings.

BRIEF DESCRIPTION OF THE DRAWINGS

FIG. 3 is an explanatory view illustrating a test pattern formed at a tip section of recording paper;

DESCRIPTION OF THE PREFERRED EMBODIMENTS

Figure 1:
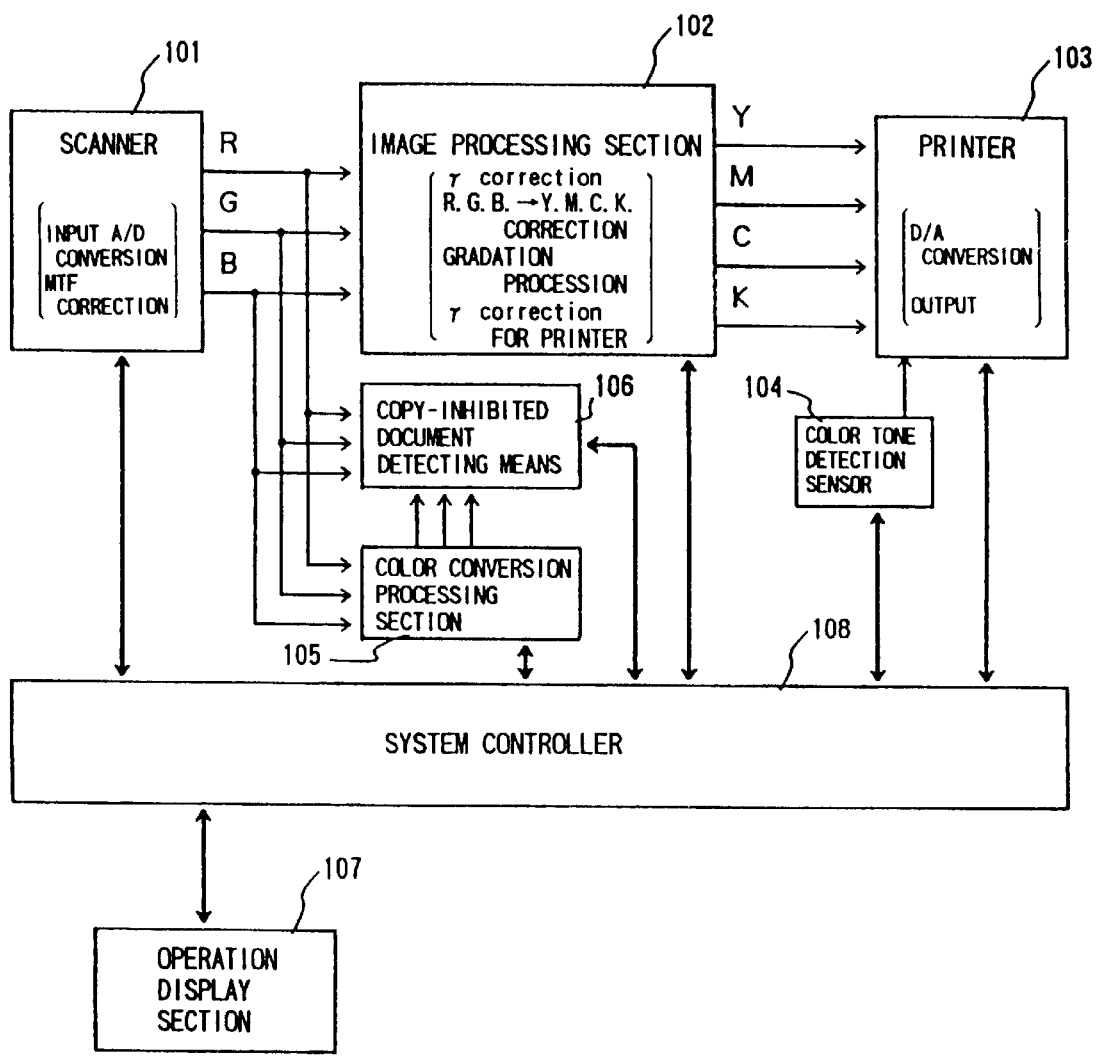
FIG. 1 is a general block diagram illustrating a color digital copying machine which is an image forming apparatus according to Embodiment 1.

FIG. 1 shows general configuration of a color digital copying machine which is an image forming apparatus according to Embodiment 1, comprising a scanner 101 into which image data from a document is inputted, an image processing section 102 which executes various types of image processing to the image data inputted with the scanner 101, a printer 103 into which image data is inputted from the image processing section 102 and also which outputs the image data onto recording paper, a color tone detection sensor 104 which detects a color of print actually printed by the printer 103, a color conversion processing section 105 into which image data is inputted from the scanner 101 and which subjects the image data to specified color conversion and sends it to a copy-inhibited document detecting section 106 described later, the copy-inhibited document detecting means 106 into which image data is inputted from the scanner 101 as well as from the color conversion processing section 105 and which makes a determination as to whether a document is a copy-inhibited one or not, an operation display section 107 for setting a number of copies to be prepared and various types of operating mode and providing various types of message display or the like, and a system controller 108 for controlling each of the sections described above.

Image data is inputted from a document into the scanner 101 as analog signals for 3 colors of red (R), green (G), and blue (B), and the scanner 101 executes A/D conversion to convert an analog signal to a digital signal, furthermore MTF correction to the signal, and outputs image data comprising three colors of R, G, and B.

When image data for the three colors of R, G, and B (herein brightness data) is inputted, the image processing section 102 converts the image data to image data (density data) comprising colors of yellow (Y), magenta (M), cyan (C) and black (B) by executing γ correction and furthermore solving the masking equation, furthermore subjects the image data to γ correction for a printer so that the image data will be suited to characteristics of the printer 103, and outputs the image data to the printer 103.

When image data comprising colors of Y, M, C and K (digital signals) is inputted, the printer 103 executes D/A conversion to convert a digital signal to an analog signal, drives a laser beam writing system according to analog signals converted from digital signals for each color, develops the image with toner, outputs the image data sequentially onto recording paper, synthesizes the four colors on the recording paper, and discharges the recording paper.

Figure 2:
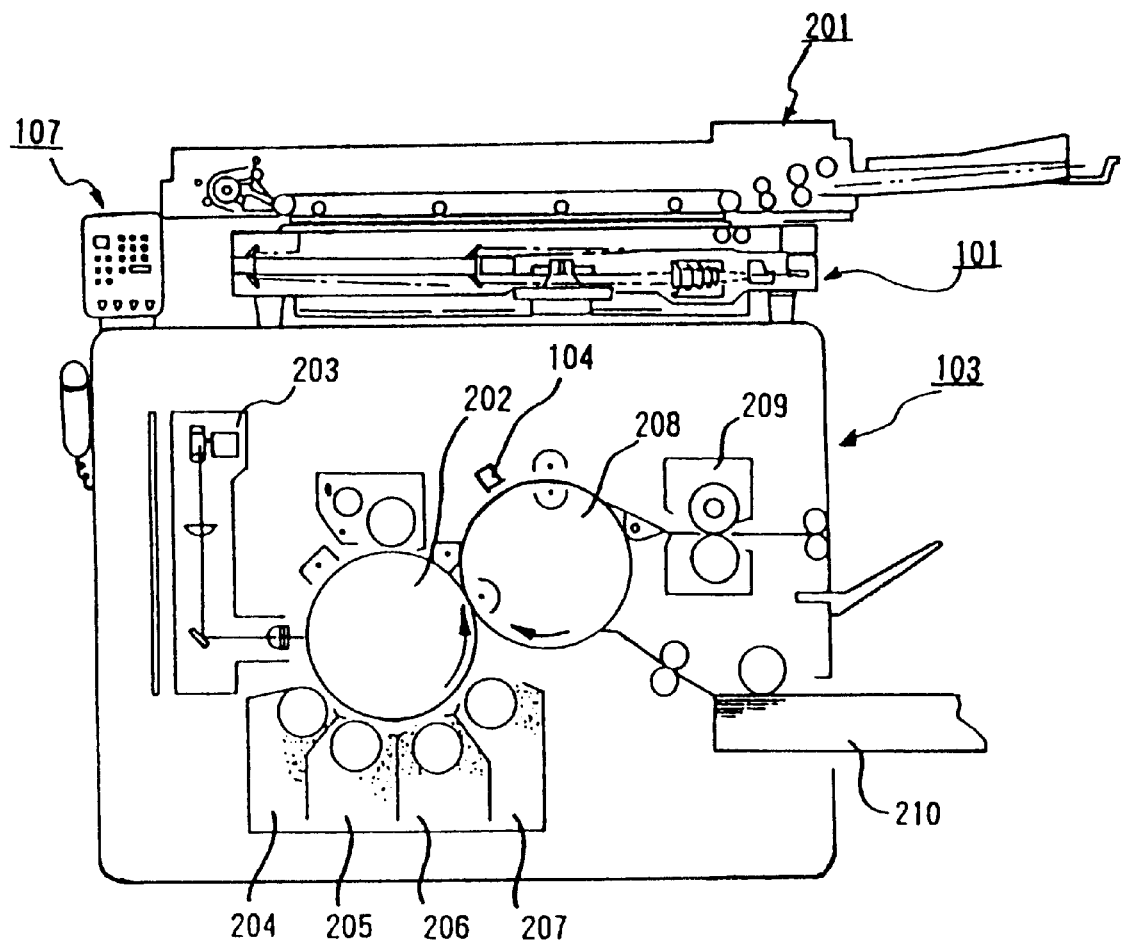
FIG. 2 is an explanatory view for illustrating general configuration of a printer according to Embodiment 1 as well as arrangement of color tone detection sensors in the printer.

FIG. 2 is an explanatory view for illustrating general configuration of the printer 103 and arrangement of the color tone detection sensor 104 within the printer 103. In this figure, designated at the reference numeral 201 is an automatic document feeder which feeds documents one by one to the scanner 101, at 202 a transfer drum, at 203 a laser beam writing system, at 204 to 207 developing devices executing development with toner for Y, M, C and K respectively, at 208 a rotary drum which rotates sustaining recording paper, at 209 a fixing unit, and at 210 a paper feeder which feeds recording paper.

As shown in this figure, the color detection sensor 104 is provided at a position allowing detection of the tone of a color of an image (a test pattern described later) sustained on the rotary drum 208. The color tone detection sensor 104 comprises a CCD sensor which can detect three colors of R, G, and B, and as shown in FIG. 3, detects a color tone of a test pattern formed at a tip section of the recording paper. It should be noted that, although not illustrated herein, a light source for irradiating a light beam to a test pattern is provided near the color tone detection sensor 104.

Figure 4:
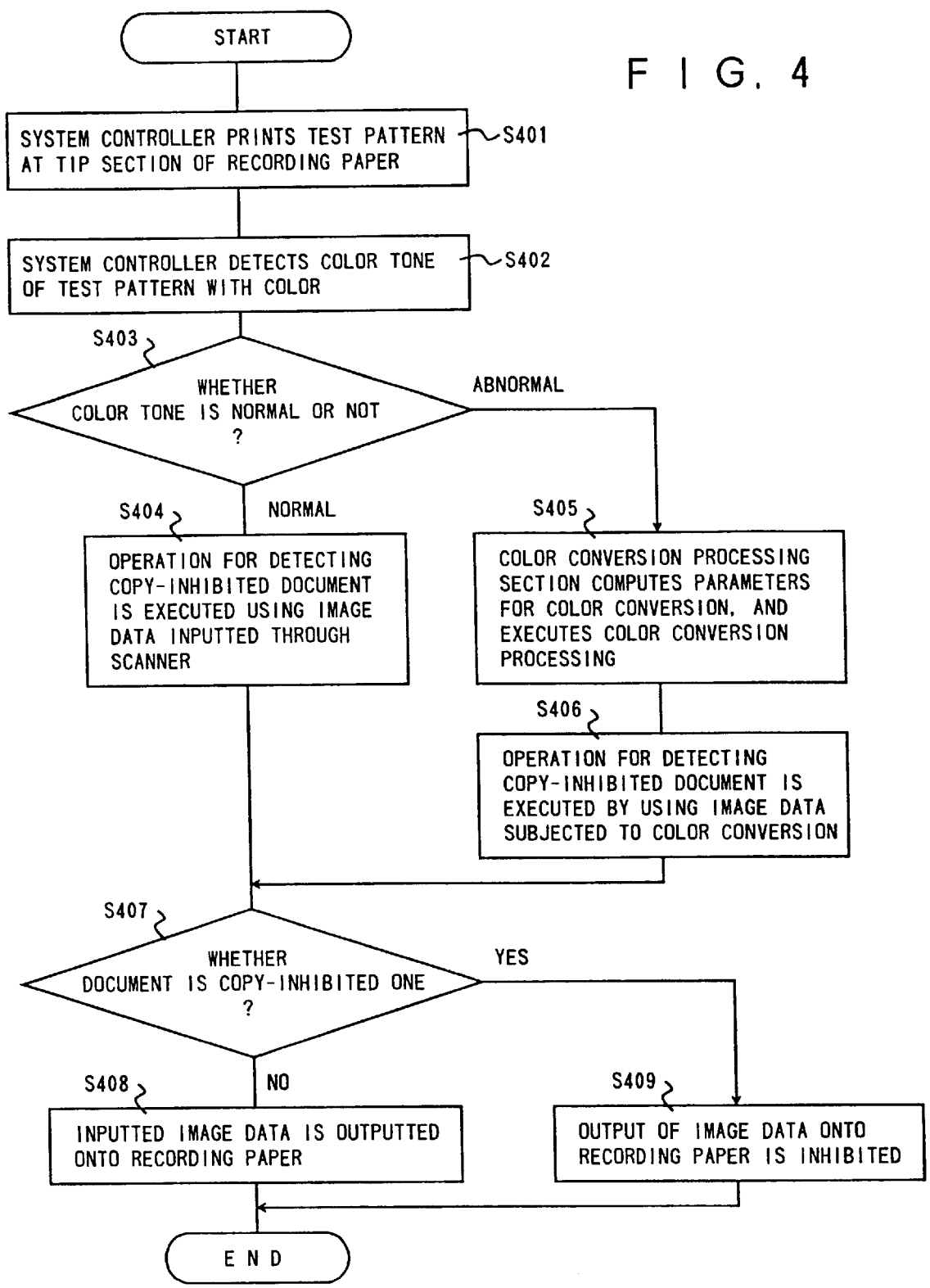
FIG. 4 is a flow chart illustrating an operation for detecting a copy-inhibited document in Embodiment 1.

With the configuration described above, next description is made for the operations. FIG. 4 is a flow chart illustrating an operation for detecting a copy-inhibited document in Embodiment 1. When the Copy Start key in the operation display section 107 (not shown herein) is pressed down, the system controller 108 prints a test pattern at a tip section of the recording paper as shown in FIG. 3 (S401), and detects the color tone of the test pattern as color signals R', G', B' with the color tone detection sensor 104 (S402).

Then the color tone data (detected color signals R', G', B') detected by the color tone detection sensor 104 are inputted into the system controller 108, where the inputted color tone data is compared to each value of color tone data as well as to reference values set previously (correct values to be outputted by the printer 103) and a determination is made whether the color tone is normal or not (S403).

When the color tone is normal, an operation for detecting a copy-inhibited document is executed in the copy-inhibited document detecting section 106 using the image data (color signals R, G, B) inputted through the scanner 101 (S404). As a method of detecting a copy-inhibited document in the copy-inhibited document detecting section 106, for instance, a method of detecting a copy-inhibited document by comparing a form of histogram based on color distribution (color tone data) or the like can be applied.

On the other hand, if the color tone is abnormal, the color conversion processing section 105 computes parameters for color conversion, and executes color conversion processing to the image data (color signals R, G, B) inputted through the scanner 101 using the parameters for color conversion computed as described above (S405).

Next description is made for an operation for computing parameters for color conversion in the color conversion processing section 105. The color signals R, G, B inputted through the scanner 101 are outputted through the printer 101 onto recording paper as color signals R', G', B' detected by the color tone detection sensor 104. In other words, the color signals R, G, B are converted to and outputted as the color signals R', G', B'. For this reason, it is required only to obtain conversion matrix (parameters $P_{11}$ to $P_{33}$) in the expression 1 for conversion as parameters for color conversion.

$$\begin{pmatrix} R' \\ G' \\ B' \end{pmatrix} = \begin{pmatrix} P_{11} & P_{12} & P_{13} \\ P_{21} & P_{22} & P_{23} \\ P_{31} & P_{32} & P_{33} \end{pmatrix} \begin{pmatrix} R \\ G \\ B \end{pmatrix} \quad [\text{Expression 1}]$$

Then inputted image data (color signals R, G, B) are subjected to color conversion using the above expression for conversion, and an operation for detecting a copy-inhibited document is executed in the copy-inhibited document detecting section 106 using the image data subjected to color conversion (S406). As described above, detection of a copy-inhibited document is executed according to the color tone data actually outputted (color signals R', G', B' subjected to color conversion) in the copy-inhibited document detecting section 106, so that accuracy in detection can be improved. However, sometimes color conversion is impossible in Step S405 (namely, if it is impossible to compute parameters for color conversion), and in such cases the copy-inhibited document detecting section 106 automatically determines that the document is a copy-inhibited one.

Then the system controller 108 makes a determination, based on a result of detection by the copy-inhibited document detecting section 106, as to whether a document is a copy-inhibited one or not (S407), and, if the document is not a copy-inhibited one, outputs the inputted image data through the image processing section 102 and the printer 103 onto recording paper (S408), and terminates the processing. On the other hand, if the document is a copy-inhibited one, the system controller 108 executes an output inhibit processing, gives instruction for stopping the operation to the image processing section 102 and the printer 103 to inhibit output of image data onto recording paper (S409).

As described above, in Embodiment 1, the color tone of an image actually outputted onto recording paper is detected by the color tone detection sensor 104 prior to an operation for detecting a copy-inhibited document in the copy-inhibited document detecting section 106, and if the detected color tone is not a specified one, the operation for detecting a copy-inhibited document in the copy-inhibited document detecting section 106 is executed using the image data subjected to color conversion through the color conversion processing section 105, so that, even if a color tone of image data is intentionally changed, detection of a copy-inhibited document can be executed at a high precision. Also even if a color of toner used in the printer 103 is intentionally changed, inhibition of copying a copy-inhibited document can be executed without fail.

Furthermore by using a CCD equivalent to that for reading images in the scanner 101 in the color tone detection sensor 104, such fluctuations as change of output parameters, dispersion in input devices, and difference in characteristics are absorbed by the expression for conversion described above, and accuracy in detection is insured.

Figure 5:
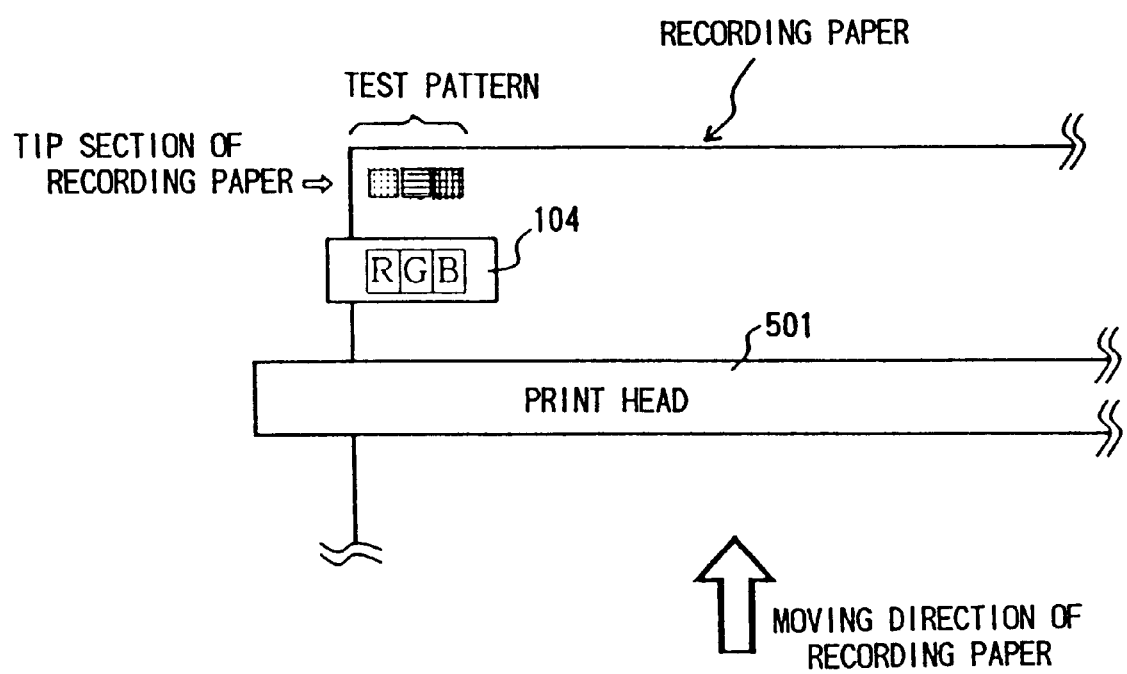
FIG. 5 is an explanatory view illustrating a case where color tone detection sensor is provided in parallel to a print head in a printer based on an ink-jet system.

It should be noted that, although an image output device based on an electronic photograph system is used as the printer 103 in Embodiment 1, for instance, a printer based on an ink-jet system can be used similarly. In this case, as shown in FIG. 5, the color tone detection sensor 104 can be arranged in parallel to a print head 501 for use. Also a form of a test pattern to be printed at a tip section of recording paper is not limited to any specific one, and it is needless to say that, as shown in FIG. 5, three colors of R, G, B may be printed in parallel.

Figure 6:
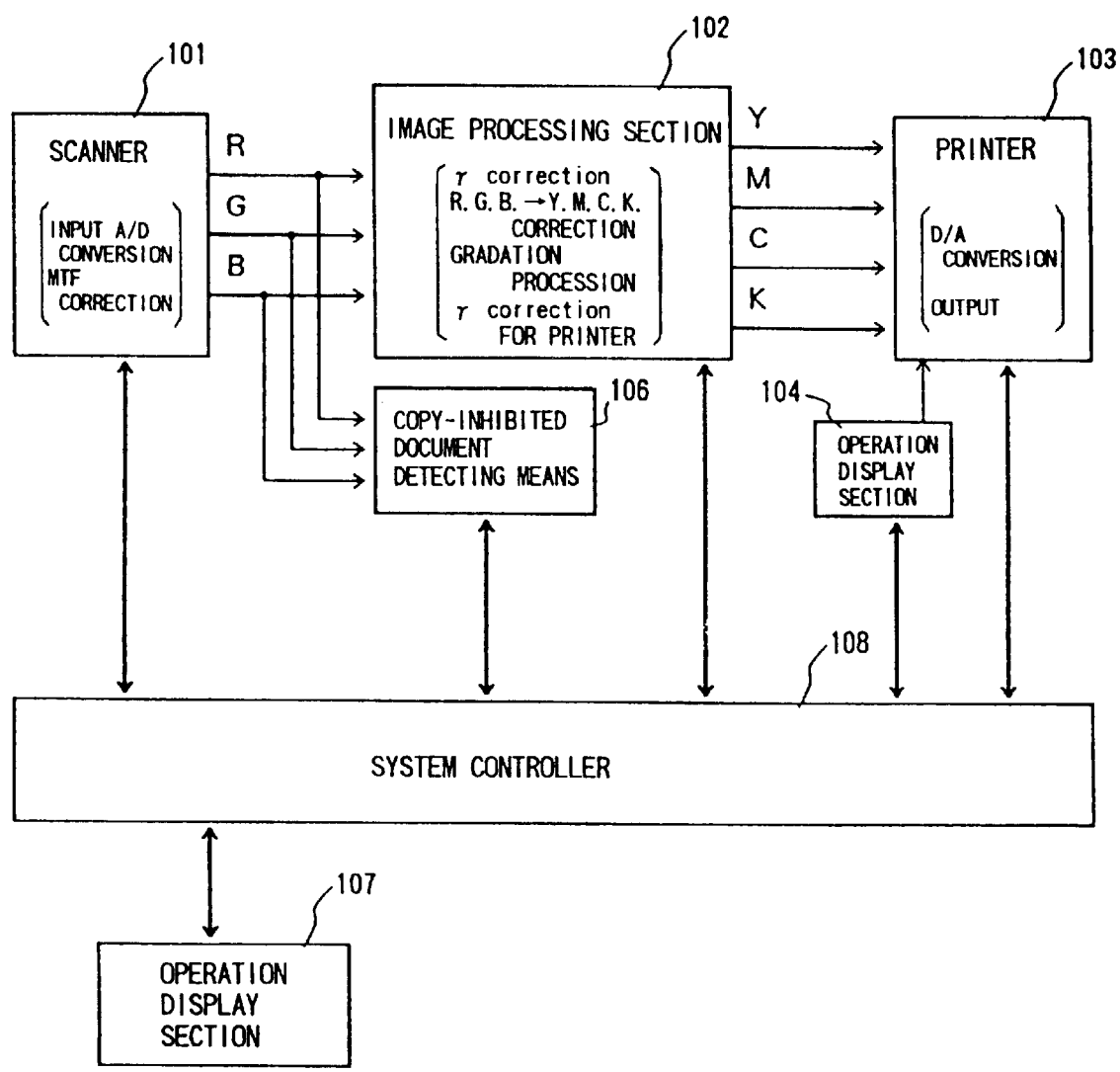
FIG. 6 is a general block diagram illustrating a color digital copying machine which is an image forming apparatus according to Embodiment 2.

FIG. 6 shows general configuration of a color digital copying machine which is an image forming apparatus according to Embodiment 2, and the configuration is the same as that in Embodiment 1 shown in FIG. 1 excluding the point that the color conversion processing section 105 is not included. It should be noted that remaining portions of the configuration are the same as those in Embodiment 1 and for this reason description thereof is omitted herein.

In Embodiment 2, an operation for detecting a color tone is executed, prior to an operation for detecting a copy-inhibited document detecting section 106, by the color tone detection sensor 104 to detect the tone of colors actually printed by the printer 103, and if the detected color tone is not a specified one, an output operation by the printer 103 is inhibited.

Figure 7:
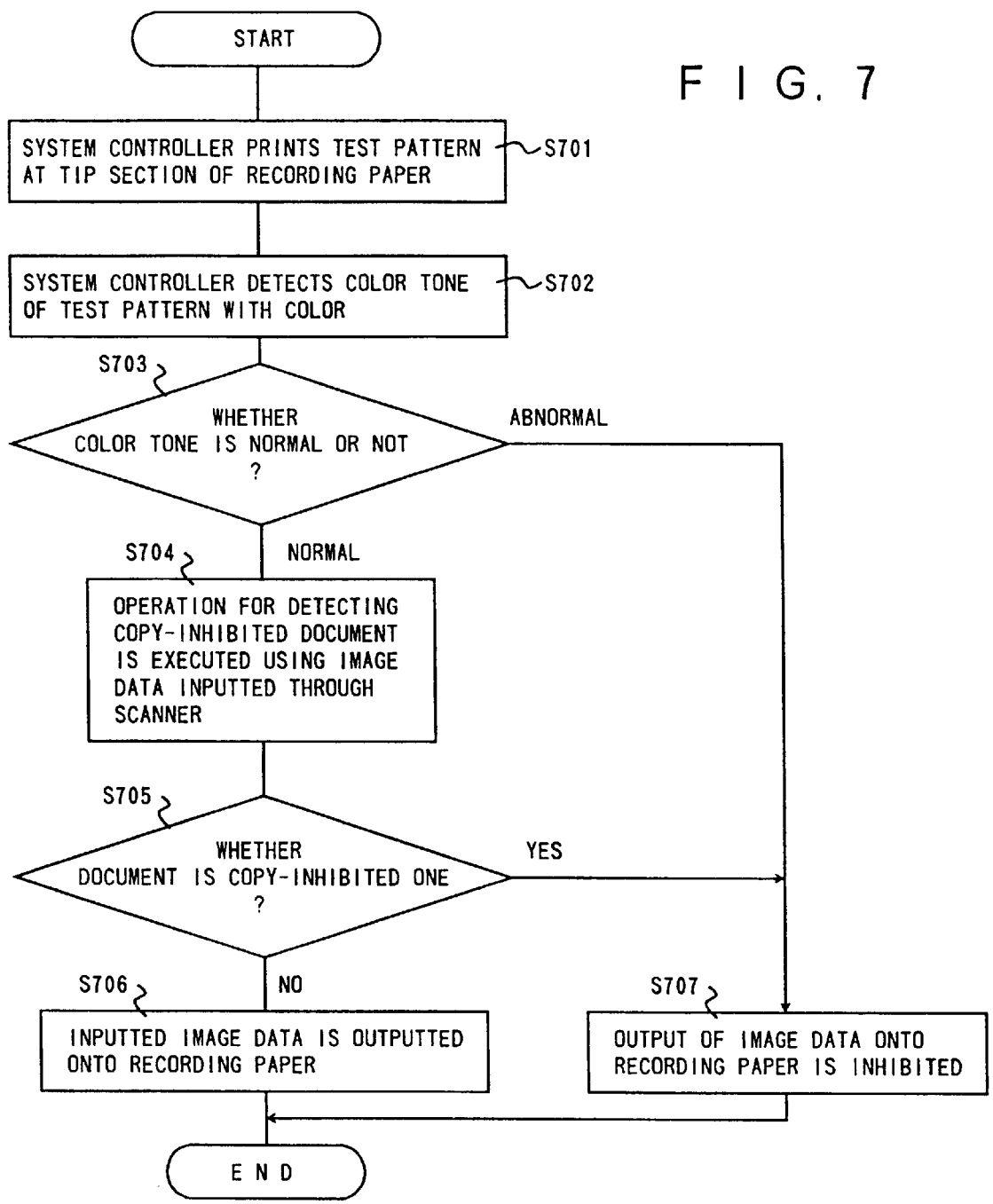
FIG. 7 is a flow chart illustrating an operation for detecting a copy-inhibited document according to Embodiment 2.

With the configuration described above, next description is made for the operation. FIG. 7 is a flow chart illustrating an operation for detecting a copy-inhibited document in Embodiment 2. When the Copy Start key (not shown herein) in the operation display section 107 is pressed down, the system controller 108 prints a test pattern at a tip section of recording paper as shown in FIG. 3 (S701), and the color tone of the test pattern is detected by the color tone detection sensor 104 (S702).

Then color tone data detected by the color tone detection sensor 104 are inputted into the system controller 108, where each value for the color tone data is compared to the reference value for checking whether the value is a correct one to be printed by the printer 103 or not for making a determination as to whether the color tone is normal or not (S703).

If the color tone is abnormal, an operation for inhibiting output is executed with an instruction for stopping given to the image processing section 102 and the printer 103, and output to recording paper is inhibited (S707), thus the processing being terminated.

On the other hand, if the detected color tone is normal, the copy-inhibited document detecting section 106 executes an operation for detecting a copy-inhibited document using the image data inputted through the scanner 101 (S704). As a method of detecting a copy-inhibited document in the copy-inhibited document detecting section 106, for instance, a method of detecting a copy-inhibited document by comparing forms of histogram (color tone data) based on color phase distribution may be used similarly.

Then the system controller 108 makes a determination, based on a result of determination in the copy-inhibited document detecting section 106, as to whether a document is a copy-inhibited one or not (S705), and, if the document is not a copy-inhibited one, outputs the inputted data through the image processing section 102 and the printer 103 onto recording paper (S706), and terminates the processing. On the other hand, if the document is a copy-inhibited one, the system controller 108 executes an output inhibit processing, gives an instruction for stopping the processing, and inhibits output of the image data to recording paper (S707).

As described in Embodiment 2, the tone of a color actually printed by the printer 103 is detected by the color tone detection sensor 104 prior to an operation for detecting a copy-inhibited document in the copy-inhibited document detecting means, and, if the detected color tone is not a specified one, an output operation by the printer 103 is inhibited, so that, even if a color of toner, ink or the like used in an image output device (herein the printer 103) is intentionally changed, copying of a copy-inhibited document can be prevented without fail.

Figure 8:
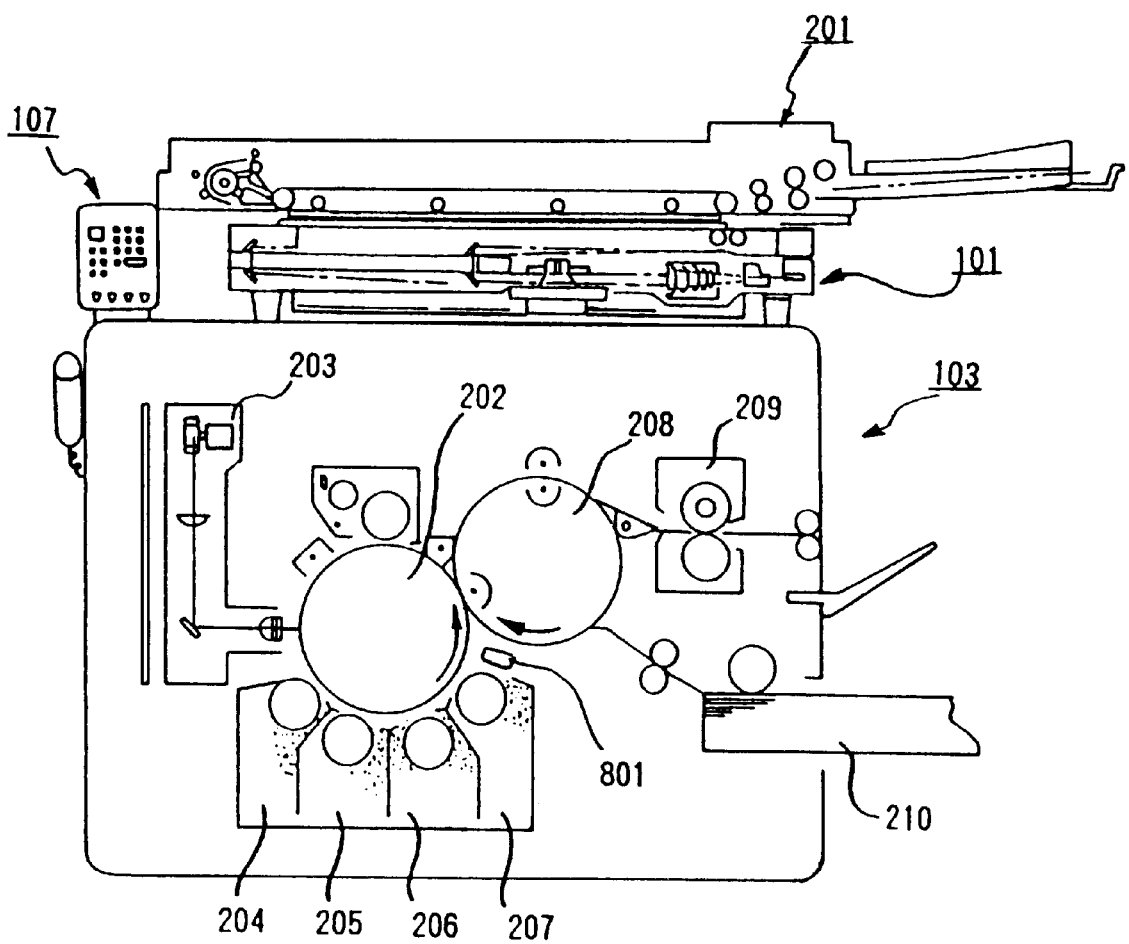
FIG. 8 is an explanatory view illustrating arrangement of color tone detection sensors according to Embodiment 3.

In Embodiment 3, a color tone detection sensor 801 for detecting a color tone of an toner image formed on the transfer drum 202 is provided, as shown in FIG. 8, in place of the color tone detection sensor 104 in Embodiment 1. It should be noted that other portions of the configuration are the same as those in Embodiment 1 and description thereof is omitted therein.

With the configuration described above, when the Copy Start key (not shown herein) in the operation display section 107 is pressed down, the system controller 108 forms a test pattern on the transfer drum 202, and detects the color tone of a test pattern with the color detection sensor 801. Later on the common operations to Steps S403 to S409 in Embodiment 1 are executed, thus the same effect as that in Embodiment 1 being achieved. Also in Embodiment 3, as a test pattern is formed on the transfer drum 202, recording paper is not contaminated.

Figure 9:
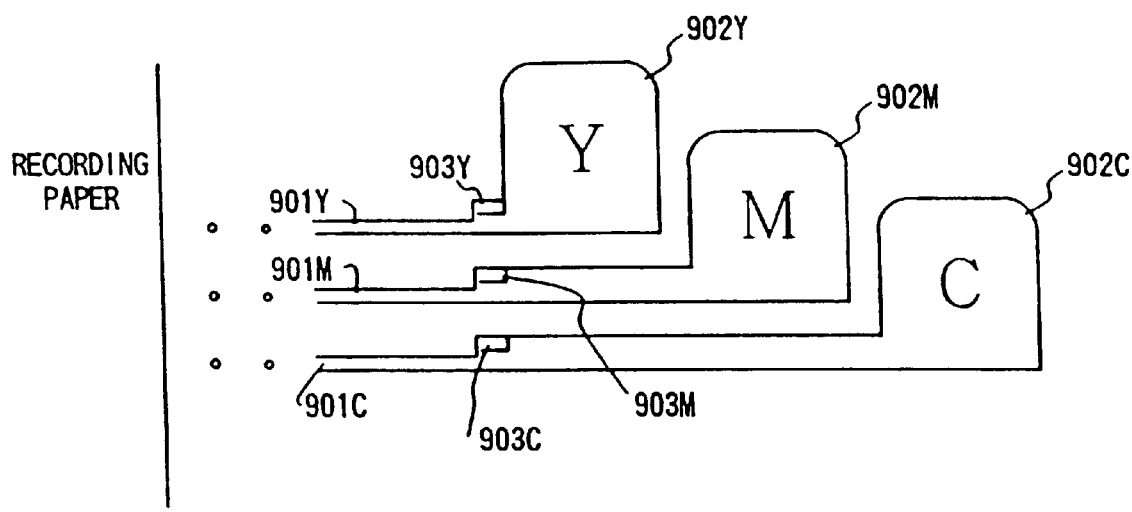
FIG. 9 is an explanatory view illustrating arrangement of color detection sensors according to Embodiment 4.

In Embodiment 4, a printer based on an ink-jet system is used as the printer 103 in Embodiment 1, and furthermore color detection sensors 903Y, 903M, 903C each for detecting a color of ink inside an ink carrier tube for carrying therethrough ink from ink bottles 902Y, 902M, 902C for colors Y, M, C respectively are provided in place of the color tone detection sensor 104, as shown in FIG. 9. It should be noted that the reference numerals 901Y, 901M, 901C indicate a nozzle for injecting ink onto recording paper respectively. Other portions of the configuration excluding the printer 103 are the same as those in Embodiment 1, so that illustration and explanation thereof are omitted herein.

With the configuration described above, when the Copy Start key (not shown) is pressed down, the system controller 108 detects the color tone of each type of ink with the color tone detection sensors 903Y, 903M, 903C respectively.

Assuming herein that color tones detected by the color tone detection sensors 903Y, 903M, 903C are Y, M, C respectively, when image data used in an operation for detecting a copy-inhibited document (namely image data inputted through the scanner 101) is faithfully reproduced, the relationship as expressed by the expression 2 is established between Y, M, C above and the inputted image data R, G, B.

$$\begin{pmatrix} Y \\ M \\ C \end{pmatrix} = \begin{pmatrix} U_{11} & U_{12} & U_{13} \\ U_{21} & U_{22} & U_{23} \\ U_{31} & U_{32} & U_{33} \end{pmatrix} \begin{pmatrix} R \\ G \\ B \end{pmatrix} \quad \text{[Expression 2]}$$

When Y', M', C' are outputted from the color tone detection sensors 903Y, 903M, 903C, the relationship with Y, M, C (output from the color detection sensors 903Y, 903M, 903C when the image can be reproduced faithfully) as expressed by the expression 3 is established.

$$\begin{pmatrix} Y \\ M \\ C \end{pmatrix} = \begin{pmatrix} V_{11} & V_{12} & V_{13} \\ V_{21} & V_{22} & V_{23} \\ V_{31} & V_{32} & V_{33} \end{pmatrix} \begin{pmatrix} Y' \\ M' \\ C' \end{pmatrix} \quad \text{[Expression 3]}$$

For this reason, the expression 4 can be obtained from the expression 2 and expression 3, and accuracy in detection can be improved by converting inputted image data R, G, B to color signals R', G', B' using the expression 4 and executing an operation for detecting a copy-inhibited document using the obtained result in the copy-inhibited document detecting section 106.

$$\begin{pmatrix} R' \\ G' \\ B' \end{pmatrix} \begin{pmatrix} U_{11} & U_{12} & U_{13} \\ U_{21} & U_{22} & U_{23} \\ U_{31} & U_{32} & U_{33} \end{pmatrix}^{-1} \quad \text{[Expression 4]}$$

$$\begin{pmatrix} V_{11} & V_{12} & V_{13} \\ V_{21} & V_{22} & V_{23} \\ V_{31} & V_{32} & V_{33} \end{pmatrix}^{-1} \begin{pmatrix} U_{11} & U_{12} & U_{13} \\ U_{21} & U_{22} & U_{23} \\ U_{31} & U_{32} & U_{33} \end{pmatrix} \begin{pmatrix} R \\ G \\ B \end{pmatrix}$$

As described above, with Embodiment 4, in addition to the effects achieved in Embodiment 1, the advantage that recording paper is not contaminated is provided.

Although description of Embodiments 1 to 4 above assumes a case where the image forming apparatus according to the present invention is applied in a color digital copying machine, it is clear that the same effects can be achieved by applying the invention in a color facsimile device, a color printer or the like.

As described above, the image forming apparatus according to the present invention has an image input means for optically reading an image from a document to input the image data or for inputting image data through an interface with an external device, an image processing means for executing various types of image processing to the input data described above, an image output means for outputting an image onto recording paper according to the image data subjected to image processing by the image processing means, and a copy-inhibited document detecting means for making a determination as to whether the input image data is a copy-inhibited one such as a copy of, for instance, bills, marketable securities or not, and comprises a color tone detecting means for detecting the tone of a color actually printed by the image output means, a color converting means for executing color conversion to the input image data described above, and a control means for executing color tone detection with the color tone detecting means prior to an operation for detecting a copy-inhibited document in the copy-inhibited document detecting means described above, causing the copy-inhibited document detecting means to execute an operation for detecting a copy-inhibited document using the image data subjected to color conversion through the color converting means when the detected color tone is not a specified one, or causing the copy-inhibited document detecting means to execute an operation for detecting a copy-inhibited document using the input image data when the detected color tone is a specified one, so that, even if a color tone of image data is intentionally changed, detection of a copy-inhibited document can be executed at a high precision. Also even if the tone of a color of toner or ink used by the image output means is intentionally changed, copying of a copy-inhibited document can be prevented without fail.

Also the image forming apparatus according to the present invention has an image input means for optically reading an image from a document to input the image data or for inputting image data through an interface with an external device, an image processing means for executing various types of image processing to the input data described above, an image output means for outputting an image onto recording paper according to the image data subjected to image processing by the image processing means, and a copy-inhibited document detecting means for making a determination as to whether the input image data is a copy-inhibited one such as a copy of, for instance, bills, marketable securities or not, and comprises a color tone detecting means for detecting the tone of a color actually printed by the image output means, and a control means for executing color tone detection with the color tone detecting means prior to an operation for detecting a copy-inhibited document in the copy-inhibited document detecting means described above and inhibiting an output operation by the color detection means when the detected color tone is not a specified one, so that, even if the tone of a color of toner or ink used by the image output means is intentionally changed, copying of a copy-inhibited document can be prevented without fail.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus comprising:
   an image input means for optically reading an image from a document to input image data or inputting image data through an interface with an external device;
   an image processor for executing various types of image processing to the image data inputted by said image input means;
   an image output means for outputting an image to be analyzed onto recording paper;
   a copy-inhibited document detector for making a determination as to whether said input image data is a copy-inhibited document such as a copy of bills or marketable securities;
   a color tone detector for detecting the tone of a color of the image to be analyzed which was actually printed by said image output means;
   a color convertor for subjecting said input image data to color conversion; and
   a controller for executing color tone detection with said color tone detector prior to an operation for detecting a copy-inhibited document in said copy-inhibited document detector, causing said copy-inhibited document detector to execute an operation for detecting a copy-inhibited document using the image data subjected to color conversion through said color convertor when the detected color tone is not a specified one, or causing said copy-inhibited document detector to execute an operation for detecting a copy-inhibited document using said input image data when the detected color tone is a specified one.

2. An image forming apparatus according to claim 1, wherein said color convertor computes parameters used for color conversion from the tone of colors detected by said color tone detector and executes color conversion using said parameters.

3. An image forming apparatus according to claim 2, wherein said controller inhibits operations of said image output means when said color convertor can not compute parameters used for color conversion.

4. An image forming apparatus according to claim 1, wherein said image output means outputs a test pattern for color tone detection at a tip section of recording paper prior to an operation for outputting said input image data while said color tone detector detects the color tone of the output test pattern for color tone detection.

5. An image forming apparatus according to claim 1, wherein said image output means outputs color toner onto a transfer drum prior to an operation for outputting said input image data onto recording paper while said color tone detector detects the color tone of color toner outputted on said transfer drum.

6. An image forming apparatus according to claim 1, wherein said image output means outputs an image onto recording paper using a colored ink while said color tone detector detects a color of said colored ink.

7. A method of forming images, comprising the steps of:

generating a color image to be analyzed by sensing a tone thereof;

sensing the tone of the color image which has been generated;

detecting that a generation of subsequent images should be inhibited using the tone of the color image which has been sensed; and inhibiting the generation of the subsequent images when the step of detecting detects that the generation of the subsequent images should be inhibited.

8. A method according to claim 7, wherein the sensing step comprises:

sensing the tone of the color image to be analyzed which is on recording paper.

9. A method according to claim 7, wherein the sensing step comprises:

sensing the tone of the color image to be analyzed which is on a transfer surface, before any operation of transferring the color image to recording paper.

10. A method according to claim 7, further comprising the steps of:

determining parameters used for color conversion using the tone of the color image which has been sensed; and inputting an image to be generated and detecting colors thereof, wherein the inhibiting step inhibits the generation of the subsequent images on recording paper using the parameters used for color conversion and the colors of the image to be generated.

11. A method according to claim 7, wherein:

the step of detecting comprises detecting that a generation of the subsequent images should be inhibited because the subsequent images are of a copy-inhibited document.

12. A method according to claim 7, wherein:

the generating step generates a color image to be analyzed which is a test pattern, the sensing step senses the tone of the test pattern, and the detecting step detects that a generation of the subsequent images should be inhibited when the tone of the test pattern is abnormal.

13. A system for forming images, comprising:

means for generating a color image to be analyzed by sensing a tone thereof;

means for sensing the tone of the color image which has been generated;

means for detecting that a generation of subsequent images should be inhibited using the tone of the color image which has been sensed; and means for inhibiting the generation of the subsequent images when the means for detecting detects that the generation of the subsequent images should be inhibited.

14. A system according to claim 13, wherein the means for sensing comprises:

means for sensing the tone of the color image to be analyzed which is on recording paper.

15. A system according to claim 13, wherein the means for sensing comprises:

means for sensing the tone of the color image to be analyzed which is on a transfer surface, before any operation of transferring the color image to recording paper.

16. A system according to claim 13, further comprising:

means for determining parameters used for color conversion using the tone of the color image which has been sensed; and means for inputting an image to be generated and detecting colors thereof, wherein the means for inhibiting inhibits the generation of the subsequent images on recording paper using the parameters used for color conversion and the colors of the image to be generated.

17. A system according to claim 13, wherein:

the means for detecting comprises means for detecting that a generation of the subsequent images should be inhibited because the subsequent images are of a copy-inhibited document.

18. A system according to claim 13, wherein:

the means for generating generates a color image to be analyzed which is a test pattern, the means for sensing senses the tone of the test pattern, and the means for detecting comprising means for detecting that a generation of the subsequent images should be inhibited when the tone of the test pattern is abnormal.

* * * * *